Oct. 12, 1965     J. E. LEONARD ETAL     3,211,640
ENCAPSULATED TRANSDUCER
Filed Jan. 29, 1962
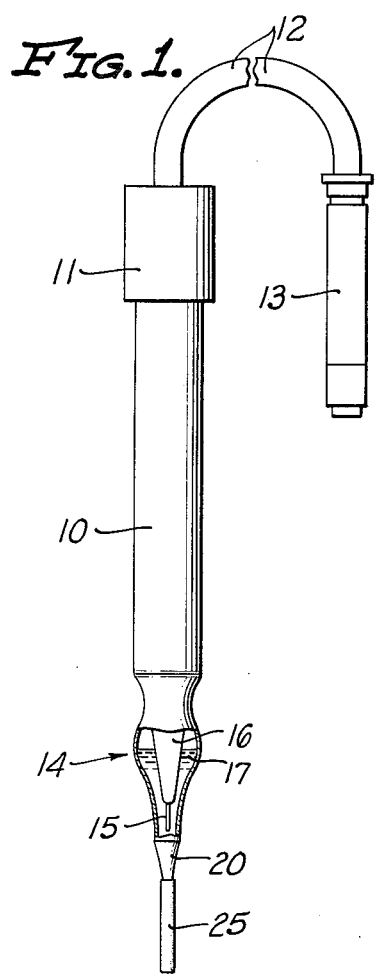
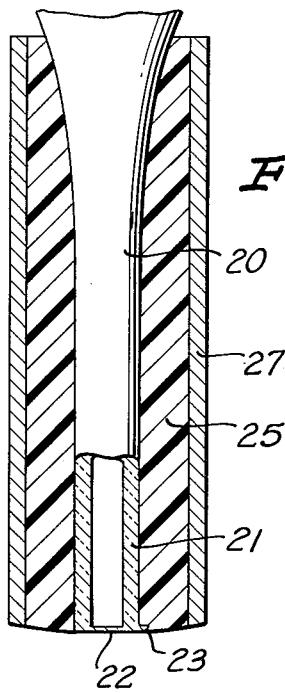
INVENTORS
JOHN E. LEONARD,
EDWIN P. ARTHUR
BY THEIR ATTORNEYS
HARRIS, KIECH, RUSSELL & KERN United States Patent Office 3,211,640
Patented Oct. 12, 1965

3,211,640
ENCAPSULATED TRANSDUCER
John E. Leonard and Edwin P. Arthur, Fullerton, Calif., assignors to Beckman Instruments, Inc., a corporation of California
Filed Jan. 29, 1962, Ser. No. 169,372
2 Claims. (Cl. 204—195)

This invention relates to glass electrodes for ion potential measurements and in particular, to a new structure for small electrodes and methods of making same.

The copending application of Lynn B. Leonard entitled "Glass Electrode and Method of Making Same," Serial No. 169,371, filed concurrently with this application and assigned to the same assignee, discloses a new electrode having a long and very thin needle-like tip for ion potential measurement. The structure of this copending application is very well adapted for certain applications, however, the needle-like glass tip is delicate and fragile. Also, a tail is often formed at the end of the needle-like tube, which tail detracts from a smooth end structure desired for many applications. Such tails are often encountered in various types of glass working and have been removed by shearing, mechanical working, fire polishing and the like. However, these techniques are not useable in conjunction with conductive glass membranes for glass electrodes.

Accordingly, it is an object of the present invention to provide a new and novel structure for a glass electrode incorporating a needle end to produce a smooth and mechanically strong structure at the sensitive end. A further object of the invention is to provide new and novel methods of making such electrode structures.

It is a particular object of the invention to provide a glass electrode for electrochemical measurements including an elongate needle-like glass tube closed with a conductive glass membrane and a nonconductive jacket disposed about and adhered to said tube. A further object is to provide such a structure in which the glass membrane has a tail at the edge thereof and in which the jacket is substantially flush with the membrane and encloses the tail. A further object is to provide such a structure in which the needle-like tube is encapsulated within a sleeve with a nonconductive material such as a potting resin or the like.

It is also an object of the invention to provide new and novel methods of making the glass electrodes including molding the nonconductive jacket about the glass tube, encapsulating the glass tube in a sleeve, and dipping the tube one or more times in a coating material and subsequently setting the material to form the nonconductive jacket.

The invention also comprises novel details of construction and novel combinations of parts and steps, which will more fully appear in the course of the following description. The drawing merely shows and the description merely describes preferred embodiments of the present invention which are given by way of illustration or example.

In the drawing:

FIG. 1 shows a typical glass electrode incorporating the invention;

FIG. 2 is an enlarged sectional view showing the sensitive end of the electrode of FIG. 1; and FIG. 3 is a view similar to FIG. 2 showing an alternative form of the invention.

The glass electrode of FIG. 1 includes a glass stem 10, a cap 11, a cable 12, and a connector 13. The lower end of the stem may be molded to any desired shape as shown at 14 or may be left cylindrical. A needle-like tube is formed at the tip of the stem and is closed with a glass membrane, as is described in detail in the aforesaid copending application of Leonard. A half cell, such as a silver wire 15 with a silver chloride coating, is supported in a tube 16 and immersed in an electrolyte 17.

The needle-like tube 20 at the lower end of the stem 10 is shown in greater detail in FIG. 2. The open end 21 of the tube 20 is closed by a glass membrane 22, the membrane-forming operation leaving a tail 23 at the tube end. Typically, the tube 20 will have an outside diameter of ten to twenty thousandths of an inch and the membrane 22 will be in the order of twenty to forty microinches thick.

In the electrode of the present invention, the tube 20 is enclosed in a jacket 25 of electrically nonconducting material. The jacket is formed about and adheres to the tube and is preferably flush with the membrane end of the tube, as shown in FIG. 2. The jacket will enclose the tail 23 providing a smooth end for the electrode. Also, the jacket will provide structural reinforcement for the fragile glass tube, thereby meeting both objectives of the invention in a single structure. Typically, the jacket will be in the range of one-sixteenth to three-eighths inch in diameter and will extend along the thin portion of the glass tube.

The material of which the jacket is formed should be a good electrical insulator, should be relatively inert in the samples in which it will be placed, and should have good adhesive qualities for adhering to the glass tube. Suitable materials for making the jacket include thermosetting resins such as epoxy resins and polyester resins, and silicone rubber.

In one method of making the electrode, the glass tube may be positioned in a mold and the jacket material added thereto in liquid form. After the jacket material has set, the jacketed electrode is removed from the mold. For certain materials, it may be desirable to warm the structure for a period of time to accelerate cure of the material.

In another method of making the jacket, the jacket material may be prepared in liquid form and the glass tube dipped therein to pick up a coating of material of the tube. This coating is allowed to dry. The dipping and drying may be repeated several times to build up a desired thickness on the tube. The membrane end of the structure is then cleaned to remove the jacket material from the membrane. Then the structure may be further dried or heated to complete the setting of the jacket material.

An alternative form of the electrode is shown in FIG. 3, wherein the glass tube is potted or encapsulated within a sleeve 27, with the potting material corresponding to the jacket 25 of the structure of FIG. 2. The sleeve 27 could be a thin wall metal tube, a paper tube, or a ceramic or plastic tube. In the assembly operation, the glass tube may be positioned within the sleeve and the jacketing material in liquid or paste form forced into the space between the sleeve and tube, preferably from the sleeve and remote from the membrane to maintain the membrane free of jacketing material. The material may be set and/or cured in the usual manner, after which the electrode structure is ready for use in ion potential measurements.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:
1. A glass electrode for electrochemical measurements including in combination:
    an elongate needle-like glass tube formed of ion sensitive glass having a portion of the tube end formed into a membrane disposed laterally across and closing the tube end, said membrane having a tail at the edge thereof;
and a nonconductive jacket disposed about and adhered to said tube, with said jacket enclosing said tail and being substantially flush with said membrane.

2. A glass electrode for electrochemical measurements including in combination:
an elongate needle-like glass tube formed of ion sensitive glass having a portion of the tube end formed into a membrane disposed laterally across and closing the tube end, said membrane having a tail at the edge thereof;
a sleeve spaced from and positioned about said glass tube and extending substantially to said membrane;
and a nonconductive material filling the space between said sleeve and tube and sealing said sleeve in place on said tube, said material enclosing said tail and being substantially flush with said membrane.

References Cited by the Examiner

UNITED STATES PATENTS

| | | |
|---|---|---|
| 2,117,596 | 5/38 | Bender et al. |
| 2,311,977 | 2/43 | Coleman. |
| 2,986,511 | 5/61 | Digby. |

FOREIGN PATENTS

| | | |
|---|---|---|
| 492,936 | 9/38 | Great Britain. |

OTHER REFERENCES

"Science," Nov. 11, 1932, pages 441–443.

Dean et al.: "Pro. Iowa Acad. of Science," 1934, pages 127–132, vol. 41.

JOHN H. MACK, *Primary Examiner.*

JOHN R. SPECK, WINSTON A. DOUGLAS,
*Examiners.*